Dec. 15, 1953     R. LE V. DECKER     2,662,664
VACUUM STORAGE UNIT FOR GROUND COFFEE
Filed Dec. 24, 1948                                       2 Sheets-Sheet 2
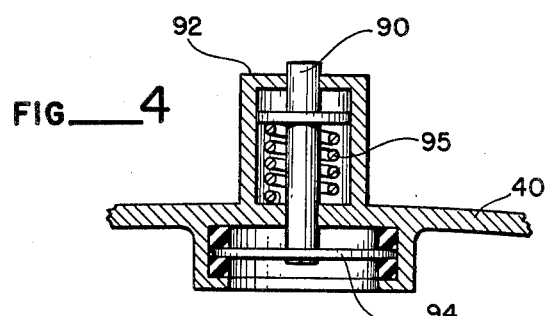
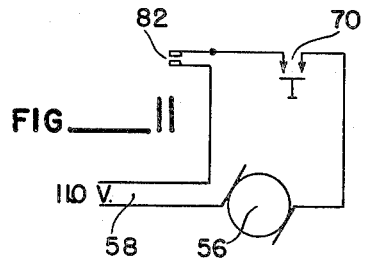
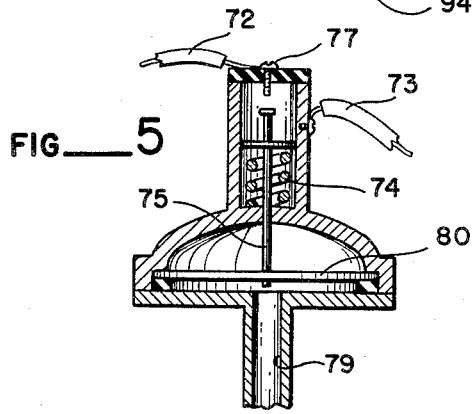
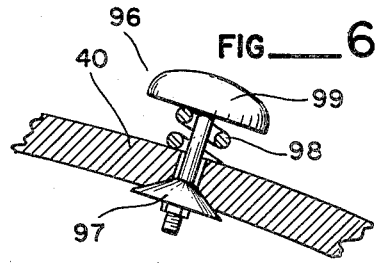
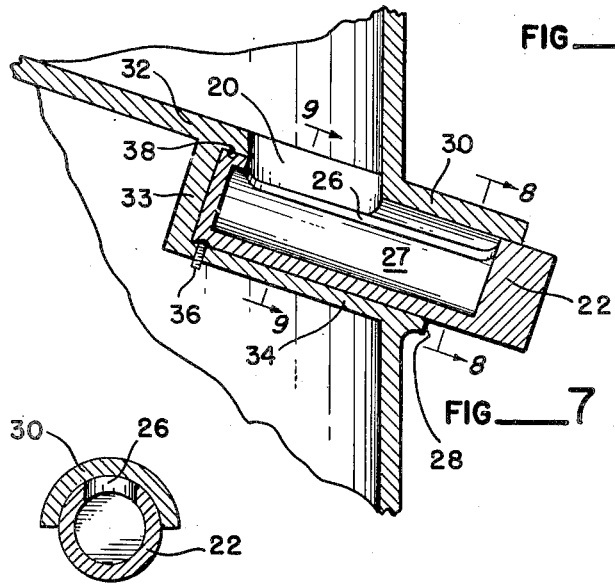
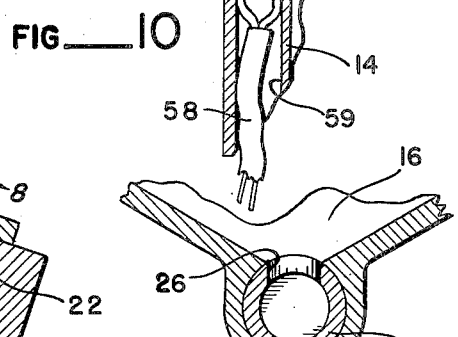
ROY L. V. DECKER
Inventor
By Smith & Tuck
Attorneys

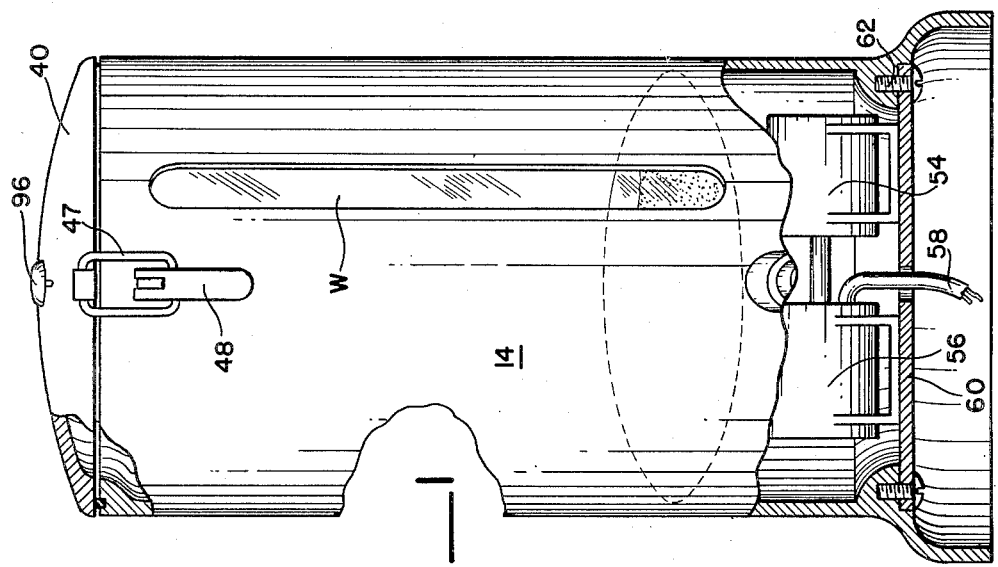
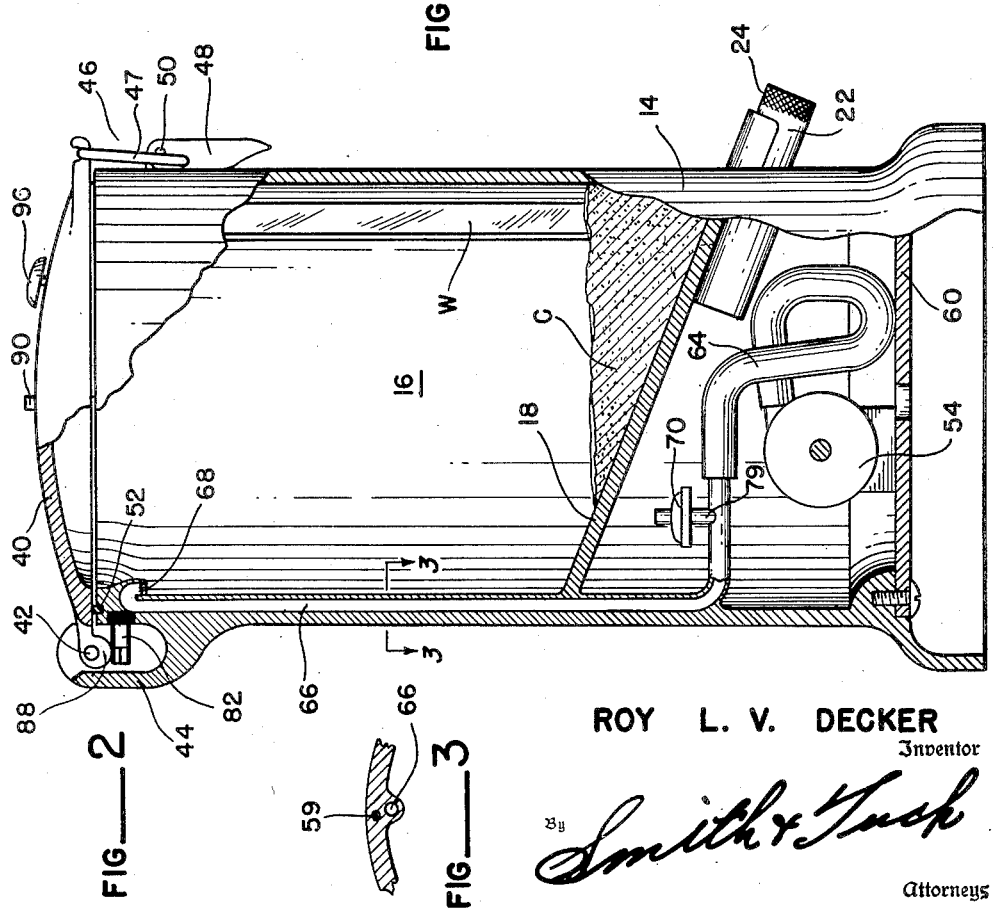

UNITED STATES PATENT OFFICE 2,662,664

VACUUM STORAGE UNIT FOR GROUND COFFEE

Roy Le Vern Decker, Seattle, Wash., assignor of one-half to Charles Glen Smith, Seattle, Wash.

Application December 24, 1948, Serial No. 67,160

4 Claims. (Cl. 222—23)

My present invention relates to the general class of devices intended for the storage and preservation of food products and the like, and more particularly to a vacuum storage unit for ground coffee.

There are many approved products made of nuts and beans which are used in preparing meals for human consumption. A large number of these products, such as, for instance, nuts and coffee, beans and the like, can be stored for long periods without deterioration in their natural or green state. However, for human consumption it is necessary to roast such items and then, to make general use of the same, they must be ground or cut into small particles. This is particularly true of ground nuts, and more especially true of coffee. In both of these cases, the roasting process tends to drive off some of the moisture and to a degree cook the oils, which actually are the food element, or the beverage producing element of the nuts or beans.

In preserving coffee, it has been found that the green coffee bean can be stored for long periods, but after being roasted the coffee deteriorates rapidly upon exposure to air. This characteristic is greatly aggravated when the coffee is ground. It has been found that in grinding coffee, the large number of small cells occurring in the husk portion of the bean are broken, cracked or ruptured so that the oils which are normally extracted in the process of making coffee, are exposed to air, although surface tension normally will hold these oils within the cells of the coffee beans, even though the bean itself is ground so that the particles are quite small. On exposure to air, the oils soon become rancid, and this action completely destroys that characteristic coffee flavor. Normally, coffee is handled commercially on the basis of having the same kept in storage in the green bean, and then it is roasted for daily use, and normally is ground and placed in sealed containers or air-tight bags and then delivered to restaurants and the like, where it is used normally the day that it is ground. In fact, in many instances, the coffee is ground on the premises in order that it may be used immediately after grinding. Such use has proved to give the truest, most aromatic flavor to the coffee as brewed.

Now it is possible for users of large amounts of coffee to have to use all of the coffee soon after it is ground. This is not true, particularly of the average household, where a single pound of coffee will last for many days. Under such conditions, it is normally experienced that the first few times coffee is brewed from a fresh ground package of coffee, the resultant brew is of high quality, but as the successive days pass, the quality of the brew diminishes, until finally the last brewings are of questionable worth. It is for this reason that many ground coffees are delivered to the home consumer in one pound vacuum packed, sealed containers. Under such conditions, the first of the coffee is excellent, but it is difficult indeed to maintain any storage of coffee that does not permit ready access of air with a resultant deterioration of the coffee.

In my present coffee storage and dispensing device, I provide means that are practical for employment in the average household for maintaining ground coffee, ground nuts and like products under vacuum conditions at all times. I achieve this by providing an air-tight container and means for evacuating the air from this chamber, so that the ground coffee stored in the chamber is under conditions very similar to that of a vacuum packed tin or glass container.

The principal object of my present invention, therefore, is to provide a storage and dispensing device adapted to store ground coffee, ground nuts, and like commodities out of contact with the atmosphere.

A further object of my invention is to provide a convenient device that will be automatic in operation, which will maintain certain products in an evacuated chamber.

A further object of my present invention is to provide a vacuum storage chamber in which the operation of the vacuum pump will be automatically maintained, so as to produce the degree of vacuum required for proper storage of certain products.

A further object of my invention is to provide means for automatically disconnecting the source of power to the vacuum source of storage device during those periods that it is not in use.

A further object of my invention is to provide dispensing means so that materials may be withdrawn from a vacuum storage chamber without appreciably destroying that vacuum and admitting fresh air to the chambers, which air in turn may have a deteriorating effect upon the products stored therein.

Further objects, advantages and capabilities will be apparent from the description and disclosure in the drawings, or may be comprehended or are inherent in the device.

Figure 1 is a view, in elevation, of a vacuum storage chamber made after the teachings of my present invention. The same has been broken away and sectioned at certain points to better illustrate the structure.

Figure 2 is a view similar to Figure 1, with the device revolved 90 degrees and with many of their parts shown in section for better illustration.

Figure 3 is a fragmentary cross-sectional view taken along the line 3—3 of Figure 2.

Figure 4 is a fragmentary view, in cross section, showing a diaphragm operated vacuum indicator.

Figure 5 is a cross-sectional view showing, somewhat diagrammatically, that structure employed in my diaphragm operated switch, which controls the power to the motor of my device.

Figure 6 is a fragmentary cross-sectional view showing a venting means for venting the storage chamber when it is desired to open the cover thereof.

Figure 7 is a vertical cross-sectional view, in fragmentary form, through the dispensing element of my device.

Figures 8 and 9 are cross-sectional views taken along similarly numbered lines of Figure 7.

Figure 10 is an enlarged sectional view, in fragmentary form, showing the main switching means, which is operated when the cover of my device is open and closed.

Figure 11 is a diagrammatic view showing the electrical circuit employed in my device.

Referring more particularly to the disclosure in the drawings, the numeral 14 designates generally the main housing of my device. This may be made of any suitable material. However, it is believed that metal will be most satisfactory in that, when the main storage chamber 16 is evacuated, there is considerable external pressure applied to this chamber, which requires greater strength than plastic, for instance, will normally accept in thin sections.

Chamber 16 is provided with a bottom 18, which slopes, as indicated in Figures 2 and 9, and should have some transverse sloping so that any material, such as the coffee indicated at C, will naturally gravitate down to the lowest point where it will be available to pass through the discharge opening 20 into the dispensing element 22. The dispensing element is probably best shown in Figures 7, 8 and 9, and consists of a generally cylindrical member 22, having a knurled portion 24 for convenient hand engagement when it is desired to rotate the same, and has an intake opening 26 which extends substantially the full length of the dispenser chamber 27. The purpose of this long opening is so that the material, such as coffee, may be introduced through discharge opening 20, and then when the cylinder is revolved 180 degrees, its natural slope will cause it to be discharged out past the overhanging lip 28, formed as part of housing 14.

The dispensing cylinder valve 22 is adapted for rotation within a cylindrical seat. This is formed by the upper extending wall as 30, the internal wall as 32, end wall 33, and the cylindrical wall 34. Depending somewhat on the type of materials used, it may be desirable at times to use sealing rings to prevent entrance of air through this valve structure when the chamber 16 is evacuated. If non-ferrous metals are used, usually these joints can be sufficiently closed as not to require any special packing, and this method is shown in the drawings. Cylinder 22 is held in its innermost position by means of a screw as 36 adapted to loosely seat, in an annular groove 38, which extends entirely around member 22.

The top closure for the chamber 16 is provided by the cover member 40. This member is hinged at 42 to a bolt which is seated within the bifurcated box bearing 44, formed normally as a part of the unitary structure of housing 14. Preferably diametrically opposed from pivot 42 is a securing latch shown generally at 46. This form of latch is quite common and consists of the link 47 and lever 48, which is pivoted at 50. In the showing in Figure 2, it will be noted that link 47 has toggled past the center of pin 50, and thus provides an adequate and secure lock. The workability of this structure and the ultimate sealing of chamber 16, however, is dependent upon a resilient gasket, as 52, which is preferably seated within a groove in the upper surface of housing 14.

Evacuation of chamber 16 is obtained by means of a vacuum pump, preferably of the impeller type, illustrated generally at 54. This pump is preferably directly connected to the electric motor 56 which may be supplied by any suitable source of power through the conductor cable 58. Both motors 56 and pump 54, are preferably mounted on the same removable plate 60, which is secured in place by a plurality of screws as 62, so that the unit can be removed for inspection or servicing. To facilitate this, it has been found convenient to employ a piece of flexible tubing as 64, which operatively connects the vacuum pump 54, and the vacuum duct 66. This duct may be a separate tube or preferably formed within the walls of housing 14, after the showing in Figure 3. At its upper end the tube is given a reverse bend so that in filling chamber 16 there will be no tendency for material to drop into the tube, and this is further assured by providing a screen at 68. Intermediate the vacuum line, I provide a vacuum operated switch as 70. This switch is probably best illustrated in Figure 5, wherein the electrical contact conductors 72 and 73 are spaced and insulated from each other with contact normally made by a spring 74, urging a conductor pin 75 upwardly until it contacts conductor 72 through means of screw 77. If 110 v. current is used, it will be desirable to employ some form of snap switch. At its lower end, connection is made by tube 79 to the suction line, and when the suction has built up to a point where diaphragm 80 can overcome spring 74, the electric circuit is broken as it is shown in Figure 5.

A second switch is provided adjacent the hinge 42. This consists of the switch mechanism showing generally at 82 and in greater detail in Figure 10, in which the electrical conductor to the motor, as 58, passes up through an opening 59, in the housing 14, with one conductor secured to the substantially rigid arm 84 and the other conductor lead to the flexible arm 86. These two contact members normally come to rest in the open position, thus breaking the current supply to the motor, and they are held in contact when the cover 40 is closed by means of the eccentric 88 encircling hinge 42. This operation is illustrated in Figure 2.

Most preferably in cover 40, I provide the vacuum indicator 90. This rod is normally raised by spring 95 above the level of the housing extension 92 when there is inadequate vacuum within cham- 16. When the vacuum or negative pressure is still up within the chamber, however, the downward drag on diaphragm 94 is sufficient to overcome spring 95 and thus retract indicator 90, showing that the device is in proper operative position.

When it is desired to open cover 40, it is necessary to introduce air to relieve the vacuum pressure in chamber 16. This is achieved through the valving arrangement indicated at 96 and in detail in Figure 6, wherein a conical valve member 97 is seated by means of spring 98, and is open by downward pressure upon head 99.

In using my device for coffee, the coffee in its ground form is deposited within chamber 16, and cover 40 is then closed and secured by means of locking arrangement shown at 46. As the closing of the cover is completed, the eccentric 88 presses downwardly on the flexible contact member 86 and completes the electric circuit through the less flexible contact member 84. Now, in this condition of no vacuum within chamber 16, the diaphragm switch 70, is in the opposite position from that illustrated in Figure 5, in that spring 74 has lifted the diaphragm and completed an electric circuit through contact with screw 77. It, therefore, follows then that the closing of cover 40 starts motor 56, and the vacuum pump 54, through duct 66, begins the evacuation of chamber 16. As soon as the vacuum has been created to the desired level at which the diaphragm valve 70 is pre-set, the downward movement of the diaphragm 80 breaks the electric circuit between rod 75 and screw 77 and thus stops the motor, and the vacuum pump connected thereto. Barring leakage, there will be no further running of the motor until additional air is admitted into chamber 16. When this occurs, however, the diaphragm switch 70 will again start the motor and will continue to operate the motor until the vacuum has been restored to the pre-determined level.

Normally, as long as there is coffee within chamber 16, and this level is at all times inspectable through the transparent window W, chamber 27, of the dispensing cylinder 22 will be filled with coffee. The operator, by grasping the knurled portion 24 of the cylinder and rotating the same through 180 degrees, will cause the coffee within chamber 27 to be dispensed and as a convenience in this, I have provided lip 28 so that a cup or other vessel can be slid up against housing member 14, under lip 28, and coffee deposited directly into it. The proportions of cylinder 22, or more properly the chamber 27, will determine the amount of coffee dispensed at each cycle of operation, and thus an accurate measuring means is provided.

It is believed that it will be clearly apparent from the above description and the disclosure in the drawings that the invention comprehends a novel construction of a vacuum storage unit for ground coffee.

Having thus disclosed the invention, I claim:

1. A vacuum storage and dispensing device for coffee and the like, comprising: a storage chamber having a hopper bottom and a cover, said storage chamber being sealed in an air-tight manner when said cover is closed; an electrically powered vacuum pump connected to said chamber and operative to exhaust air therefrom; a current supply circuit for said vacuum pump and a pressure responsive switch in said circuit operative to control the operation of said pump, said pressure responsive switch being disposed in relation to said chamber in a manner so as to be responsive to pressures therein and to activate said pump when the pressure in said chamber rises above a predetermined value; a second electric switch in said circuit operative to control the operation of said pump, said cover being connected to said second switch to open said switch when said cover opens and to close said switch when said cover closes; means for venting said chamber preliminary to opening said cover including an air passageway communicating from the inside to the outside of said chamber and a manually operable valve in said passageway; and dispensing means connecting with said hopper bottom and operative to dispense material from the contents of said chamber while maintaining a barrier in the dispensing means between the inside of said chamber and the outside of the same thereby permitting dispensing without free access of air to said chamber.

2. A vacuum storage and dispensing device for coffee and the like, comprising: a storage chamber having a cover and being sealed in an air-tight manner when said cover is closed; an electrically powered vacuum pump connected to said chamber and operative to exhaust air therefrom; a current supply circuit for said vacuum pump and a pressure responsive switch in said circuit operative to control the operation of said pump, said pressure responsive switch being disposed in relation to said chamber in a manner so as to be responsive to pressures therein and to activate said pump when the pressure in said chamber rises above a predetermined value; a second electric switch in said circuit operative to control the operation of said pump, said cover being connected to said second switch to open said switch when said cover opens and to close said switch when said cover closes; and means for venting said chamber preliminary to opening said cover including an air passageway communicating from the inside to the outside of said chamber and a manually operable valve in said passageway.

3. A vacuum storage and dispensing device for coffee and the like, comprising: a storage chamber having a hopper bottom and a cover, said storage chamber being sealed in an air-tight manner when said cover is closed; an electrically powered vacuum pump connected to said chamber and operative to exhaust air therefrom; a current supply circuit for said vacuum pump and a pressure responsive switch in said circuit operative to control the operation of said pump, said pressure responsive switch being disposed in relation to said chamber in a manner so as to be responsive to pressures therein and to activate said pump when the pressure in said chamber rises above a predetermined value; a second electric switch in said circuit operative to control the operation of said pump, said cover being connected to said second switch to open said switch when said cover opens and to close said switch when said cover closes; means for venting said chamber preliminary to opening said cover including an air passageway communicating from the inside to the outside of said chamber and a manually operable valve in said passageway; dispensing means connected with said hopper bottom and operative to dispense material from the contents of said chamber while maintaining a barrier in the dispensing means between the inside of said chamber and the outside of the same thereby permitting dispensing without free access of air to said chamber; a pressure indicator visible from the outside of said chamber and connected with the inside of said chamber and operative to indicate whether a vacuum has been produced in said chamber; and a transparent inspection window in the wall of said chamber.

4. A vacuum storage and dispensing device for coffee and the like, comprising: a storage chamber having a cover and being sealed in an airtight manner when said cover is closed; an electrically powered vacuum pump connected to said chamber and operative to exhaust air therefrom; a current supply circuit for said vacuum pump and a pressure responsive switch in said circuit operative to control the operation of said pump, said pressure responsive switch being disposed in relation to said chamber in a manner so as to be responsive to pressures therein and to activate said pump when the pressure in said chamber rises above a predetermined value; a second electric switch in said circuit operative to control the operation of said pump, said cover being connected to said second switch to open said switch when said cover opens and to close said switch when said cover closes; and dispensing means connected with said chamber and operative to dispense materials from the contents of said chamber while maintaining a barrier in the dispensing means between the inside of said chamber and the outside of the same thereby permitting dispensing without free access of air to said chamber.

ROY LE VERN DECKER.

References Cited in the file of this patent

UNITED STATES PATENTS

| Number | Name | Date |
|---|---|---|
| 1,073,641 | Smith | Sept. 23, 1913 |
| 1,347,194 | Washington | July 20, 1920 |
| 1,535,856 | Rix | Apr. 28, 1925 |
| 1,713,558 | Schollmeyer | May 21, 1929 |
| 1,936,857 | Reisdorf | Nov. 28, 1933 |
| 2,110,518 | Becker et al. | Mar. 8, 1938 |
| 2,241,938 | Wilsey | May 13, 1941 |
| 2,320,347 | Brosseau et al. | June 1, 1943 |
| 2,551,217 | Martin | May 1, 1951 |